United States Patent [19]
Ueda et al.

[11] Patent Number: 5,446,494
[45] Date of Patent: Aug. 29, 1995

[54] FOCUS DETECTING SYSTEM

[75] Inventors: Kouichi Ueda, Kanagawa; Masamichi Toyama, Tokyo; Hirofumi Suda, Kanagawa; Naoya Kaneda, Kanagawa; Youichi Iwasaki, Kanagawa, all of Japan

[73] Assignee: Canon Kabushiki Kaisha, Tokyo, Japan

[21] Appl. No.: 284,757

[22] Filed: Aug. 2, 1994

Related U.S. Application Data

[63] Continuation of Ser. No. 9,382, Jan. 27, 1993, abandoned, which is a continuation of Ser. No. 633,163, Dec. 26, 1990, abandoned, which is a continuation of Ser. No. 445,120, Nov. 30, 1989, abandoned, which is a continuation of Ser. No. 17,183, Feb. 19, 1987, abandoned.

[30] Foreign Application Priority Data

Mar. 4, 1986 [JP] Japan .................... 61-46868
Mar. 4, 1986 [JP] Japan .................... 61-46869

[51] Int. Cl.6 ............ G03B 13/36; H04N 5/232
[52] U.S. Cl. .................. 348/349; 348/354; 354/400; 354/402
[58] Field of Search .......... 358/349, 354; 354/402, 354/400

[56] References Cited

U.S. PATENT DOCUMENTS

| | | | |
|---|---|---|---|
| 3,896,304 | 7/1975 | Aoki et al. | 354/402 |
| 4,392,726 | 7/1983 | Kimura | 358/227 |
| 4,445,761 | 5/1984 | Ishikawa et al. | 354/402 |
| 4,473,287 | 9/1984 | Fukuhara et al. | 354/402 |
| 4,477,167 | 10/1984 | Ishikawa et al. | 354/400 |
| 4,500,925 | 2/1985 | Hanma et al. | 358/227 |
| 4,717,959 | 1/1988 | Isago | 358/227 |
| 4,748,509 | 5/1988 | Otake et al. | 358/227 |
| 4,762,986 | 8/1988 | Suda et al. | 358/227 |
| 5,204,749 | 4/1993 | Toyama et al. | 354/402 |

FOREIGN PATENT DOCUMENTS 60-54152 3/1985 Japan .
61-13776 1/1986 Japan .

*Primary Examiner*—Russell E. Adams
*Attorney, Agent, or Firm*—Robin, Blecker, Daley & Driscoll

[57] ABSTRACT

A focus detecting system for effecting automatic focusing by detecting the in-focus position of a focusing lens and driving the focusing lens to this position. This system has a signal processing means supplied with a video signal from image pick-up means to output a signal related to the in-focus state, a detection means for detecting the position of a focusing lens for forming an image in the image pick-up means, when the signal output from the signal processing means is processed, and a calculating means for calculating the presupposed in-focus position of the focusing lens from at least two groups of items of data on the signal outputted from the signal processing means and on the position of the focusing lens supplied from the detection means. Each time the deviation of the present position of the focusing lens from the presupposed in-focus position is calculated, the focusing lens is driven to move to an extent smaller than the deviation, thus being focused.

63 Claims, 4 Drawing Sheets

FOCUS DETECTING SYSTEM

This is a continuation application under 37 CFR 1.62 of prior application Ser. No. 08/009,382, filed Jan. 27, 1993, which is a continuation of Ser. No. 07/633,163, filed Dec. 26, 1990 (now abandoned), which is a continuation of Ser. No. 07/445,120, filed Nov. 30, 1989 (now abandoned), which is a continuation of Ser. No. 07/017,183, filed Feb. 19, 1987 (now abandoned).

BACKGROUND OF THE INVENTION

1. Field of the Invention

This invention relates to a focus detecting system for use in camera apparatus such as video cameras, and more particularly to a focus detecting system for adjusting the focus of a camera system by making use of video signals.

2. Description of the Related Art

Generally, conventional focus detecting systems are classified as being of the active or passive types. While ultrasonic systems have been known as active type focus detecting systems, infrared systems of this type are generally employed these days, in which infrared rays are emitted from the camera to form a spot on the object, and the light reflected on the object is detected by a light receiving element, thereby effecting the focusing. This is because infrared systems display a comparatively high degree of distance-metering accuracy. However, infrared systems require a linking mechanism adapted for moving the light receiving element and so forth in accordance with the camera-to-subject distance. Therefore, they have complicated forms of construction and necessitate complicated adjustment steps, thus being defective in terms of operational efficiency.

With respect to the passive type focus detecting system, there have been systems which utilize video signals of the image pick-up system, and systems utilizing no video signal. Examples of the latter type of system are the Honeywell system, the Canon SST (Solid State Triangulation) system, etc. These systems also require optical parts that are not related to the fundamental function of the image pick-up system along with a high level of adjustment technique.

Focus detecting systems utilizing video signals are advantageous in that they do not need any optical parts other than the essential optical system.

A conventional focus detecting system utilizing video signals will be described with reference to FIG. 4. As shown in FIG. 4, an image formed by a pick-up lens assembly 1 constituting an image pick-up means is converted into an electric signal by a pick-up element 2 provided as an image pick-up means, and the signal thereby obtained is amplified by a preamplifier 3. The signal amplified by the preamplifier 3 is supplied as a video signal to a monitor or a video tape recorder (not shown) by way of a processing circuit 4. Simultaneously, the high band frequency components alone of this signal which are amplified by the preamplifier 3 are separated by a band-pass filter (hereinafter referred to as "BPF") 5 and are supplied through a gate circuit 6 which picks up only signals corresponding to a predetermined image plane area on which the image pick-up system is focused when the image is displayed on the monitor or the like, for instance, the general area of the center of the picked-up image, thereby restricting the distance-metering field. The separated signal is thereafter converted by a detection circuit 7 and an integration circuit 8 into a value which represents a focused state. These elements 3, 5, 6 and 7 constitute a signal processing means. The value representing a state of focusing (hereinafter referred as "focusing value") displays a relationship with the amount of defocus (the amount of deviation from the focus) of the image pick-up lens assembly 1 such as that shown in FIG. 5. In accordance with this relationship, a motor driving circuit 9 drives, through a motor, a focusing lens in the image pick-up lens assembly 1 to the position at which the focusing value is maximized.

Next, the operation of the motor driving circuit 9 as shown in FIG. 4 will be described with reference to FIG. 5. It is assumed that the focusing is at a point indicated by a reference symbol A in FIG. 5 at the time of the commencement of distance-metering, and that a reference symbol B indicates a focusing point displayed after the focusing lens in the image pick-up lens assembly 1 has been slightly moved by a predetermined pitch. The motor driving circuit 9 compares a focusing value f(A) at the position A supplied from the integration circuit 8 with a focusing value f(B) at the point B. If f(B)>f(A), the driving circuit rotates the motor in the same direction as that in which the motor rotates to move the focusing lens from the point A to the point B. If f(B)<f(A), the direction of the rotation of the motor is reversed, and the focusing lens in the image pick-up lens assembly 1 is thereby moved in the direction of the in-focus point $X_0$.

However, the above-described conventional type of focus detecting system which utilizes video signals cannot discriminate the in-focus state until the focusing point passes through the in-focus point, and cannot obtain natural images picked up and formed. Moreover, when the state of focusing is deviated greatly from the in-focus state (called a greatly out-of-focus state), the differential focusing value f(n)-f(n-1) created by a slight amount of movement of the focusing lens is so small that the system mistakes the greatly out-of-focus state for the in-focus state.

SUMMARY OF THE INVENTION

It is an object of the present invention to provide a focus detecting system which is free from the above-described defects of the conventional type of focus detecting system utilizing video signals, which does not cause the images picked up and displayed on a monitor or the like to appear unnatural, and which does not make any mistake by judging a greatly out-of-focus state to be the in-focus state.

To this end, the present invention provides a focus detecting system comprising signal processing means supplied with a video signal from image pick-up means to output a signal related to the in-focus state, detection means for detecting the position of a focusing lens for forming an image in the image pick-up means, when the signal outputted from the signal processing means is processed and calculation means for calculating the presupposed in-focus position of the focusing lens from the value of the signal outputted from the signal processing means and from the value representing the position of the focusing lens supplied from the detection means, wherein each time the deviation of the present position of the focusing lens from the presupposed in-focus position is calculated, the focusing lens is driven to move to an extent smaller than the deviation. This arrangement enables the image pick-up system to be focused with increased accuracy, improves the properties of an image picked up and formed on a monitor display or the like, and prevents a greatly out-of-focus state from being mistaken for the in-focus state.

Other objects and features of the present invention will be clear upon reading the following descriptions with reference to the accompanying drawings.

DETAILED DESCRIPTION OF THE PREFERRED EMBODIMENT

A preferred embodiment of the present invention will be described in detail with reference to the accompanying drawings.

Figure 1:
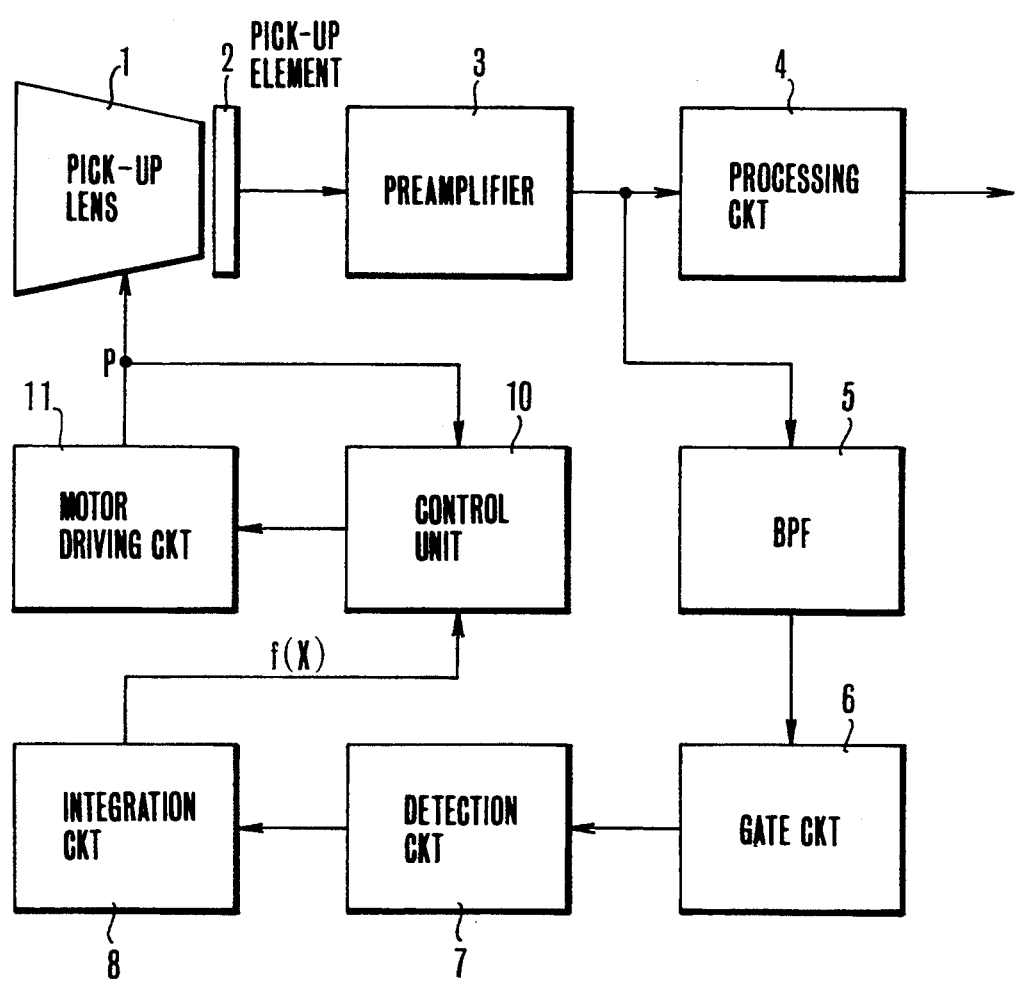
FIG. 1 is a block diagram of a circuit constituting an embodiment of the present invention.

FIG. 1 shows the construction of a focus detecting system which represents an embodiment of the present invention. In FIG. 1, reference numeral 10 denotes a control unit which includes a calculating means such as a microcomputer having memory devices and operational functions, and a detection means, and a reference numeral 11 denotes a motor driving circuit which drives a motor (not shown) to move a pick-up lens assembly 1 which constitutes an image pick-up means. The control unit 10 calculates, in accordance with the control procedures shown in FIG. 2, a preestimated in-focusing value and an extent of movement of a focusing lens from a focusing value (a value representing a state of focusing) f(x) supplied from the integration circuit 8 provided as a signal processing means, and from a value indicating the position of the focusing lens which is calculated on the basis of motor driving pulses p of the motor driving circuit 11. The control unit 10 thereby outputs a control signal to the motor driving circuit 11 for driving the motor.

Figure 4:
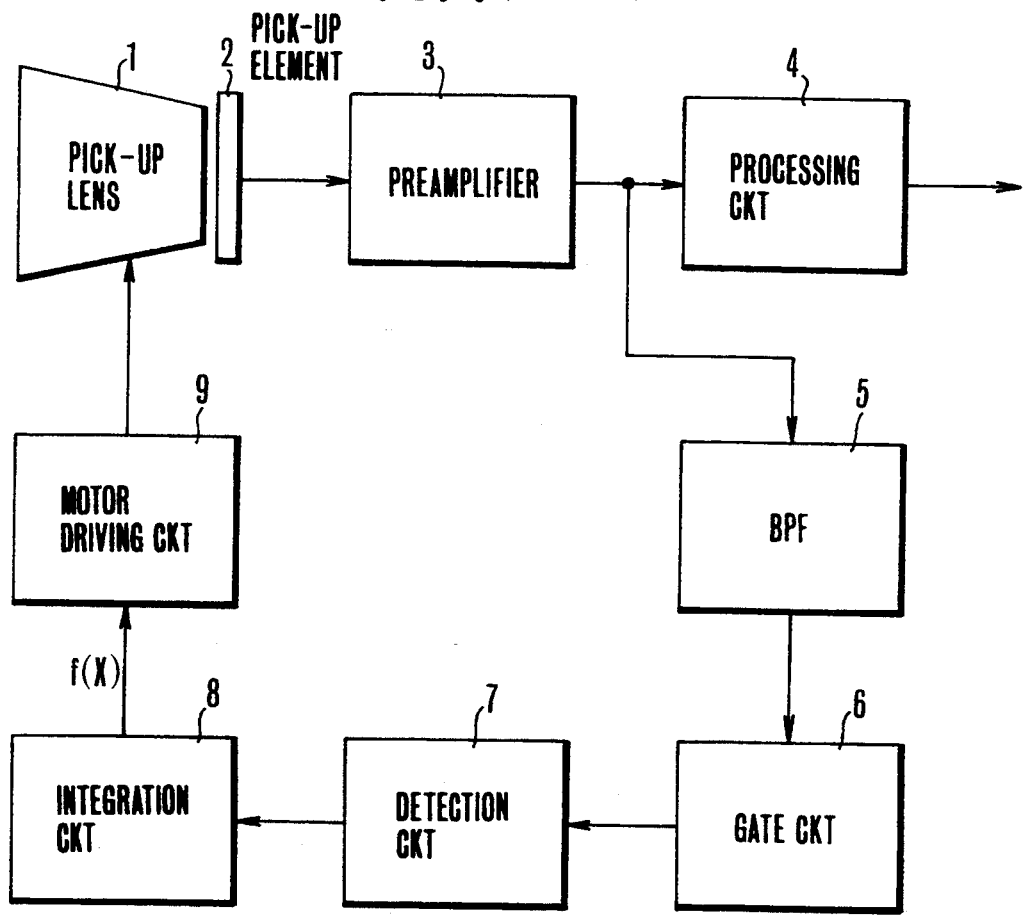
FIG. 4 is a block diagram of a circuit constituting a conventional system.
Figure 5:
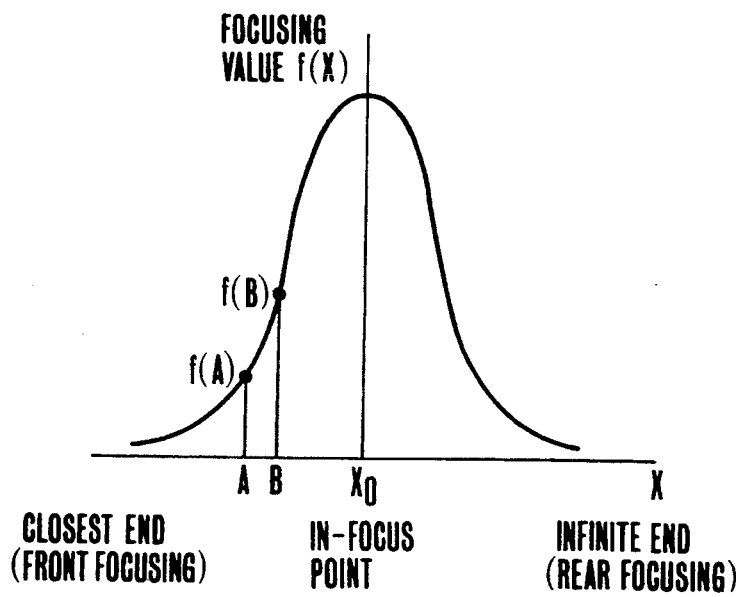
FIG. 5 is a characteristic diagram illustrating the relationship between the position X of a focusing lens and the focusing value f(x) thereof.

The motor driving circuit 11 drives and rotates the motor in the normal or reverse direction in accordance with the control signal supplied from the control unit 10, thereby moving the focusing lens in the pick-up lens assembly 1 in the direction of the in-focus point. Other components and arrangements are the same as those of the conventional automatic focusing system shown in FIG. 4, and the descriptions for them are therefore not repeated in detail.

The control unit 10 receives the output of the integration circuit 8 (focusing value) f(x) representing the state of focusing and is simultaneously supplied, in response to the pulses P outputted from the motor driving circuit 11, with an address X which represents the position of the focusing lens in the pick-up lens assembly 1. The control unit 10 stores this address (hereinafter referred to as "focusing lens position") X in its internal memory (not shown) along with the value f(x) which represents the above-mentioned state of focusing.

The above-mentioned value f(x) representing the state of focusing can be approximated by Gaussian distribution relative to the focusing lens position X, and, if the in-focus lens position is $X_0$, it is represented by an equation:

$$f(x) = a \cdot exp\{-b(X-X_0)^2\} \qquad (1)$$

where "a" is a coefficient representing the maximum value of the Gaussian distribution, and "b" is also a coefficient.

Accordingly, if values which respectively indicate the state of focusing corresponding to three different positions of the focusing lens are $(X_1, f(x_1))$, $(X_2, f(x_2))$ and $(X_3, f(x_3))$, the in-focus lens position $X_0$ is obtained by the following equation (2):

$$\frac{X_1^2 \cdot \ln(f(x_3)/f(x_2)) + X_2^2 \cdot \ln(f(x_1)/f(x_3)) + X_3^2 \cdot \ln(f(x_2)/f(x_1))}{2\{X_1 \cdot \ln(f(x_3)/f(x_2)) + X_2 \cdot \ln(f(x_1)/f(x_3)) + X_3 \cdot \ln(f(x_2)/f(x_1))\}} \qquad (2)$$

Figure 2:
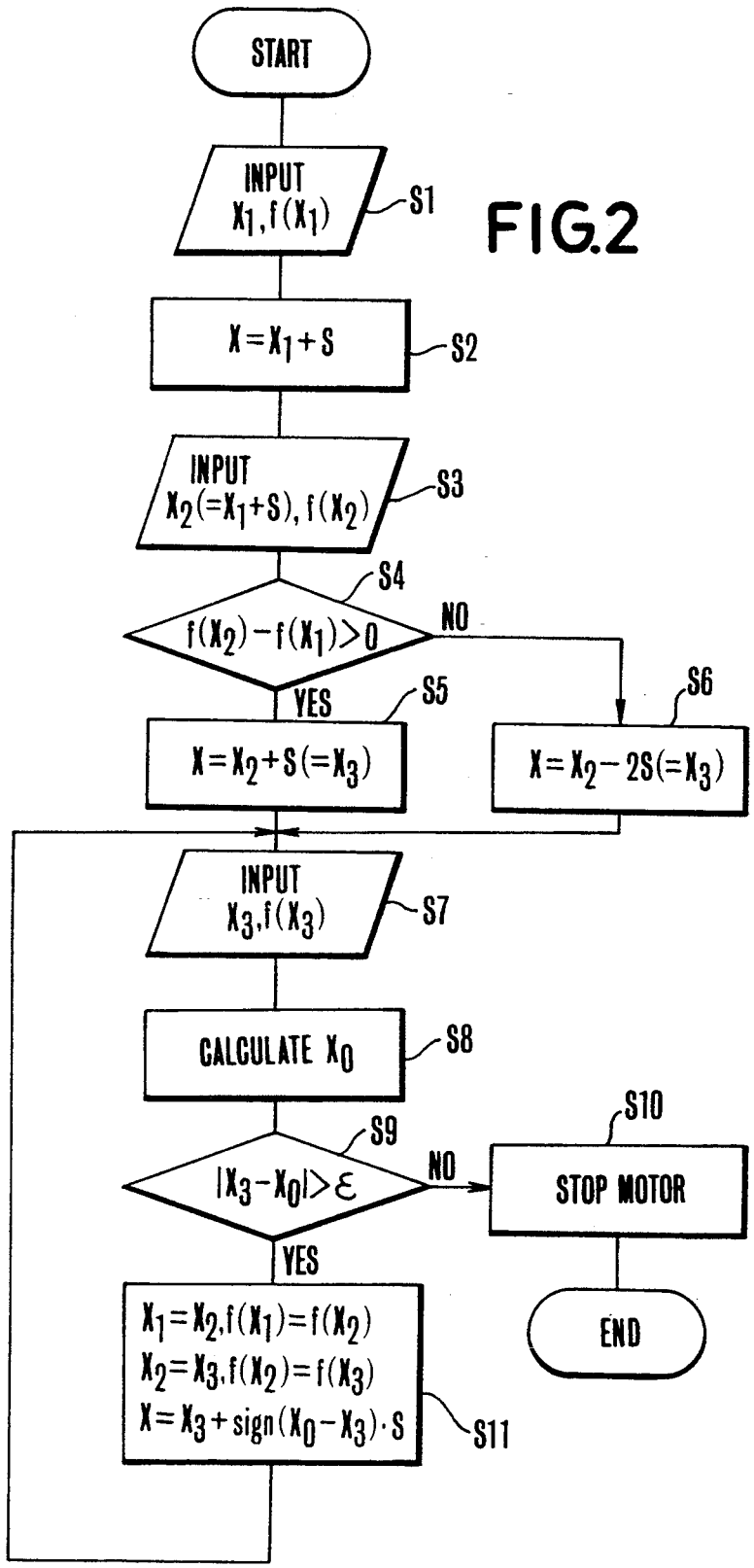
FIG. 2 is a flowchart of a first example of the control operation of the circuit shown in FIG. 1.

FIG. 2 shows a flowchart for carrying out the algorithm of the above equations (1) and (2). The control operation of the control unit 10 shown in FIG. 1 will be described with reference to the flowchart of FIG. 2. It is assumed that reference symbols S1 to S11 which indicate the step numbers of the control procedure have previously been stored in an internal program memory of the control unit 10.

A position $X_1$ and a focusing value $f(x_1)$ of the focusing lens at the time when the operation of the automatic focusing apparatus is commenced are inputted into the internal memory (S1). The focusing lens in the pick-up lens assembly 1 is then moved by a predetermined pitch of S nun in one predetermined direction (S2), and a lens position $X_2$ and a focusing value $f(x_2)$ are stored in the internal memory as in the case of S1 (S3). Then, the values $f(x_1)$ and $f(x_2)$ are compared with each other (S4). If $f(x_1) < f(x_2)$, the focusing lens is further moved by S mm in the same direction (S5), or it is moved by 2S mm in the reverse direction if $f(x_1) > f(x_2)$ (S6), thereafter storing values $X_3$ and $f(x_3)$ of the moved position in the internal memory (S7).

Next, the three groups of values $(X_1, f(x_1))$, $(X_2, f(x_2))$ and $(X_3, f(x_3))$ obtained in S1, S3 and S7 are substituted in the above equation (2) for calculating the in-focus position, thereby obtaining the presupposed in-focus position $X_0$ (S8). The degree of deviation of the present position $X_3$ of the focusing lens in the pick-up lens assembly 1 from the presupposed in-focus position $X_0$ is discriminated (S9) by the following inequality (3):

$$|X_3 - X_0| > \epsilon \qquad (3)$$

where $\epsilon$ is a vary small predetermined value indicating the width of an indiscernible range.

If in S9 the deviation $|X_3 - X_0|$ is judged to be smaller than the width $\epsilon$ of the indiscernible range, the focusing lens is considered to have reached the in-focus position and is stopped by a motor-halt command (S10).

If in S9, the deviation $|X_3 - X_0|$ is judged to be larger than the width $\epsilon$ of the indiscernible range, the focusing lens is considered to be in an out-of-focus state and to have not reached to the in-focus position. The values $(X_1, f(x_1))$ are then replaced with $(X_2, f(x_2))$, the values $(X_2, f(x_2))$ are replaced with $(X_3, f(x_3))$, and the position X to which the focusing lens will be moved is calculated by the following equation (4). The focusing lens is moved to the position calculated, and this position is newly set as $X_3$ (S11). The process is then returned to S7 to measure $f(x_3)$, obtain the presupposed in-focus position $X_0$, and repeat these steps until $|X_3-X_0|<\epsilon$ holds.

$$X = X_3 + Sign(X_0-X_3) \cdot S \quad (4)$$

The maximum value "a" of the Gaussian distribution is calculated by the equation (1) along with the above-described in-focus position presupposed, thereby enabling the amplifier in the detection circuit 7 shown in FIG. 1 to be constantly used within an operation range in which the gain thereof is not saturated. The distance-metering accuracy is thereby improved. It is possible to further increase the distance-metering accuracy near the in-focus point by varying the extent X of the movement of the focusing lens at several different degrees in accordance with the difference between the present position $X_3$ and the presupposed in-focus position $X_0$ of the focusing lens.

Figure 3:
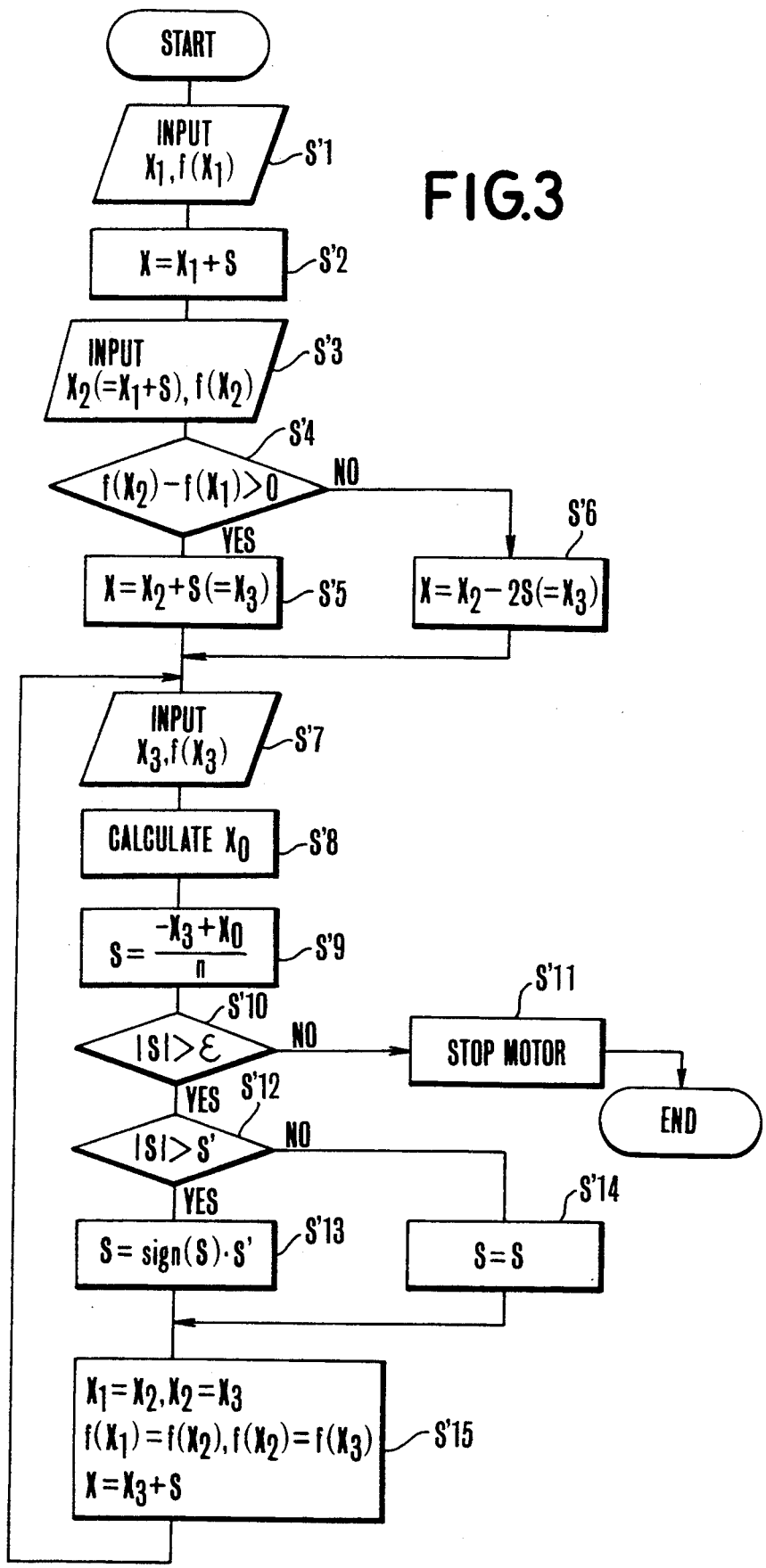
FIG. 3 is a flowchart of a second example of the control operation of the circuit shown in FIG. 1.

FIG. 3 shows another example of the control operation of the focus detecting system in accordance with the present invention. The basic arrangement of the circuit of this example is the same as that shown by the block diagram in FIG. 1, but in this example the automatic focusing operation is effected on the basis of another type of algorithm.

The present invention will be described below with respect to a sequence of steps of this automatic focusing operation.

It is assumed that reference symbols S'1 to S'15 which indicate the step numbers of the control procedure have previously been stored in the internal program memory of the control unit 10.

First, the position $X_1$ and the focusing value $f(x_1)$ of the focusing lens at the time when the operation of the automatic focusing lens in commenced are inputted into the internal memory (S'1). Next, the focusing lens in the pick-up lens assembly 1 is moved by a predetermined pitch of S mm in a predetermined direction (S'2), thereby inputting the position $X_2$ and the focusing value $f(x_2)$ of the lens into the internal memory (S'3) as in the case of S'1. The values $f(x_1)$ and $f(x_2)$ are then compared with each other (S'4). If $f(x_1)<f(x_2)$, the focusing lens is moved by S mm in the same direction (S'5), or it is moved by 2S mm in the reverse direction if $f(x_1)>f(x_2)$ (S'6), thereafter storing values $X_3$ and $f(x_3)$ Of the moved position in the internal memory (S'7).

Next, the three groups of values $(X_1, f(x_1))$, $(X_2, f(x_2))$ and $(X_3, f(x_3))$ obtained in S'1, S'3 and S'7 are substituted in the above equation (2) for calculating the in-focus position, thereby obtaining the presupposed in-focus position $X_0$ (S'8). To obtain the focusing value $f(x)$ from the position to which the focusing lens will be moved, the value representing the extent of the movement S of the focusing lens is calculated (S'9) by the following equation (5):

$$S = \frac{X_0 - X_3}{n} \quad (5)$$

where n is an integral number equal to or more than 2, for example, 3. Then the absolute value of S is obtained. If the absolute value $|S|$ is smaller than a very small predetermined value indicating the width $\epsilon$ of an indiscernible range (S'10), the focusing lens in the pick-up lens assembly 1 is considered to be in the in-focus position and the motor for driving the lens is stopped (S'11).

If the absolute value $|S|$ is judged to be larger than the width $\epsilon$ of the indiscernible range, judgement is further made as to whether or not the absolute value $|S|$ is larger than the predetermined maximum value S' (S'12). If $|S|$ is larger than S', the extent of movement S is limited to S' (S'13).

If $|S|$ is not larger than S', the value of S is set as a value of the extent of movement S (S'14).

The values $(X_1, f(x_1))$ are then replaced with $(X_2, f(x_2))$, and the values $(x_2, f(x_2))$ are replaced with $(x_3, f(x_3))$. The position of the focusing lens in the pick-up lens assembly 1 is thereafter moved by a value indicating the extent of movement S (S'15), and the process is returned to S'7 to measure new values of $(x_3, f(x_3))$ and repeat the above steps, thereby preestimating the in-focus point.

In this example of control operation, each time the focusing lens is moved, the extent on movement S of the focusing lens is calculated on the basis of the preestimated value indicating the in-focus position, and the extent of movement thereby calculated is compared with the width $\epsilon$ of the predetermined indiscernible range. Therefore it is possible to stop the focusing lens in the pick-up lens assembly 1 before the same passes over the in-focus position, thus effecting the distance-metering operation without damaging the naturalness of an image picked up and displayed.

In this example also, the maximum value "a" of the Gaussian distribution is calculated by the equation (1) along with the above-described in-focus position presupposed, thereby enabling the amplifier in the detection circuit 7 shown in FIG. 1 to be constantly used within an operation range in which the gain thereof is not saturated. The distance-metering accuracy is thereby improved.

In both the above-described examples of the control operation, the signal which corresponds to the in-focus state is obtained by utilizing the output of the operation circuit, but the present invention is not limited to this and may be otherwise arranged such that the peak value of an image signal (video signal) supplied from the image pick-up means is detected for this purpose.

In the above described examples, the in-focus position of the focusing lens is calculated and preestimated from three groups of items of data by employing Gaussian distribution. However, the present invention is not limited to this, and the presupposed position can otherwise be obtained from two groups of items of data by employing a distribution curve which has been set on the basis of prepared experimental values.

What is claimed is:
1. A focus detecting apparatus, comprising:
 a) image pick-up means;
 b) a focusing lens for forming an image on an image sensing plane of said image pick-up means;
 c) signal processing means supplied with a video signal from said image pick-up means to output a signal related to a focus degree;
 d) detection means for detecting the position of said focusing lens; and
 e) calculating means for calculating informations of a plurality of positions of said focusing lens detected by said detection means, all such positions being on a common side of an actual in-focus position and not beyond said actual in-focus position, and signals related to the focus degree outputted from said signal processing means at said positions on the basis of a predetermined characteristic defining a relation of the position of said focusing lens and the focus degree so as to estimate the position of said focusing lens where said focus degree becomes a maximum value.

2. A focus detecting apparatus according to claim 1, further comprising control means for controlling the operation of driving said focusing lens on the basis of said in-focus position obtained by said calculation means.

3. A focus detecting apparatus according to claim 1, wherein said calculating means calculates the in-focus position on the basis of the extent of movement of said focusing lens and a predetermined characteristic curve showing a variation of a signal level representing a focused degree at a moved position of the focusing lens.

4. A focus detecting apparatus according to claim 3, wherein said characteristic curve is a Gaussian distribution curve.

5. A focus detecting apparatus according to claim 2, wherein said control means includes comparison means for comparing a predetermined value with the difference between said in-focus position obtained by said calculating means and the position of said focusing lens displayed at the time corresponding to the operation of said calculating means in which said in-focus position is obtained.

6. A focus detecting apparatus according to claim 5, wherein said control means terminates the operation of driving said focusing lens when said comparison means judges that the difference between said in-focus position and the position of said focusing lens displayed at the corresponding time is smaller than said predetermined value.

7. A focus detecting apparatus according to claim 5, wherein said control means includes correction means for correcting the extent of movement to which said focusing lens is driven, said correction means operating when said comparison means judges that the difference between said in-focus position and the position of said focusing lens displayed at the corresponding time is larger than said predetermined value.

8. A focus detecting apparatus according to one of claims 5, 6 and 7, wherein said predetermined value represents the width of the indiscernible focusing range of said focusing lens.

9. A focus detecting apparatus according to claim 2, wherein, each time said calculating means is supplied with information on the absolute address of said focusing lens and on the output of said signal processing means issued at the corresponding time, said calculating means compares said information with that supplied immediately before the same to issue a command to drive said focusing lens in the direction of the approach to the in-focus position.

10. A focus detecting apparatus according to claim 7, wherein a value of said extent of movement which has been corrected by said correction means is smaller than before said extent of movement is corrected.

11. A focus detecting system apparatus according to claim 1, wherein said signal processing means includes:
a) a filter for separating a predetermined frequency component from a video signal outputted from an image pick-up element;
b) a gate circuit for limiting said video signal to a part thereof which corresponds to predetermined region on the image pick-up surface of said image pick-up element;
c) a detection circuit for detecting said video signal after the same has been processed by said filter and said gate circuit; and
d) an integration circuit for integrating the output of said detection circuit.

12. A focus detecting apparatus according to claim 1, wherein said detection means detects the position of said focusing lens from a signal for driving said focusing lens.

13. An automatic focusing apparatus, comprising:
a) image pick-up means;
b) a focusing lens for forming an image on an image sensing plane of said image pick-up means;
c) signal processing means supplied with a video signal from said image pick-up means to output a signal related to a focus degree;
d) detection means for detecting the relative position between said image sensing plane and said focusing lens;
e) memory means for storing a plurality of groups of items of information on the output of said signal processing means and on the position of said focusing lens outputted from said detection means;
f) calculation means for processing said plurality of items of information at positions of said focusing lens far off in-focus position stored in said memory means on the basis of a predetermined characteristic defining a function of the relative position and the focus degree to calculate the position between said image pick-up means and said focusing lens in-focus state where the focus degree becomes a maximum value; and
g) control means for controlling the relative position between said focusing lens and said pick-up means on the basis of an information of the position calculated by said calculating means.

14. An automatic focusing apparatus according to claim 13, wherein the content of said memory means is reset each time information on the output from said signal processing means and on the relative position between the image pick-up means and the focusing lens outputted from said detection means is inputted into said memory means.

15. An automatic focusing apparatus according to claim 13, wherein said detection means detects a moved position of said focusing lens and said calculating means calculates the in-focus position on the basis of the extent of movement of said focusing lens and a predetermined characteristic curve showing the state of focusing of the focusing lens.

16. An automatic focusing apparatus according to claim 15, wherein said characteristic curve is a Gaussian distribution curve.

17. An automatic focusing apparatus according to claim 13, wherein said detection means detects a moved position of said focusing lens and said control means includes comparison means for comparing a predetermined value with the difference between said in-focus position obtained by said calculating means and position of said focusing lens displayed at the time corresponding to the operation of said calculating means in which said in-focus position is obtained.

18. An automatic focusing apparatus according to claim 17, wherein said control means terminates the operation of driving said focusing lens when said comparison means judges that the difference between said in-focus position and the position of said focusing lens displayed at the corresponding time is smaller than said predetermined value.

19. An automatic focusing apparatus according to claim 17, wherein said control means includes correction means for correcting the extent of movement to which said focusing lens is driven, said correction means operating when said comparison means judges that the difference between said in-focus position and the position of said focusing lens displayed at the corresponding time is larger than said predetermined value.

20. An automatic focusing apparatus according to claim 18 or 19, wherein said predetermined value represents the width of the indiscernible focusing range of said focusing lens.

21. An automatic focusing apparatus according to claim 13, wherein , said detection means detects a moved position of said focusing lens, and each time said calculating means is supplied with information on the absolute address of said focusing lens and on the output of said signal processing means issued at the corresponding time, said calculating means compares said information with that supplied immediately before the same to issue a command to drive said focusing lens in the direction of the approach to the in-focus position..

22. An automatic focusing system having an image pick-up optical system, said system comprising:
   a) focus detection means arranged to detect a signal corresponding to a condition of said image optical system;
   b) calculating means arranged to calculate results of detection of said detection means at a plurality of points of time on the basis of a predetermined characteristic defining a relation of the positions of said image pick-up optical system and the focus condition in a movable range of said image pick-up optical means for focusing operation so as to estimate a deviation from an in-focus position of said image pick-up optical system; and
   c) control means for driving said image pick-up optical system to an extent smaller than said deviation each time the value of the deviation is calculated.

23. An automatic focusing system according to claim 22, wherein said control means includes comparison means for comparing the value of said deviation with a predetermined value.

24. An automatic focusing system according to claim 23, wherein said control means includes correction means for correcting the extent of movement to which said image pick-up lens is moved.

25. An automatic focusing system according to claim 23, wherein said control means stops the movement of said image pick-up lens when said comparison means judges said deviation to be smaller than said predetermined value.

26. An automatic focusing system according to claim 24, wherein said control means controls said correction means to correct the extent of movement of said image pick-up lens when said comparison means judges said deviation to be larger than said predetermined value.

27. An automatic focusing system according to one of claims 23, 25 and 26, wherein said predetermined value represents the width of the indiscernible focusing range of said image pick-up lens.

28. An automatic focusing system according to claim 24, wherein said correction means includes means for limiting the maximum value of the extent of movement of said image pick-up lens.

29. An automatic focusing system according to claim 22, wherein said calculating means calculates the deviation from the in-focus position from information on the state of focusing obtained from a video signal outputted from an image pick-up means and from information on the position of the image pick-up lens.

30. A focus detecting system, comprising:
   a) processing means for effecting photoelectric conversion of an incident light corresponding to an image of an object, thereby outputting a signal related to said image of the object;
   b) detecting means for detecting a position of a focusing optical system; and
   c) calculating means for calculating a plurality of positions of said optical system detected by said detecting means and output signals of said processing means at said positions on the basis of a predetermined characteristic defining a relation of the position of said focusing optical system and the output signals of said processing means in a movable range of said optical system for focusing operation relative to an in-focus position so as to estimate the in-focus position of said optical system.

31. A focus detecting system according to claim 30, further comprising control means for controlling the operation of driving said focusing optical system on the basis of said in-focus position obtained by said calculating means.

32. A focus detecting system according to claim 30, wherein said calculating means calculates the in-focus position on the basis of the extent of movement of said focusing optical system and a predetermined characteristic curve showing a variation of a signal level representing a focused degree at a moved position of the focusing optical system, said characteristic curve being a Gaussian distribution curve.

33. A focus detecting system according to claim 31, wherein said control means includes comparison means for comparing a predetermined value with the difference between said in-focus position obtained by said calculating means and the position of said focusing optical system displayed at the time corresponding to the operation of said calculating means in which said in-focus position is obtained.

34. A focus detecting system according to claim 33, wherein said control means terminates the operation of driving said focusing optical system when said comparison means judges that the difference between said in-focus position and the position of said focusing optical system displayed at the corresponding time is smaller than said predetermined value.

35. A focus detecting system according to claim 33, wherein said control means includes correction means for correcting the extent of movement to which said focusing optical system is driven, said correction means operating when said comparison means judges that the difference between said in-focus position and the position of said focusing optical system displayed at the corresponding time is larger than said predetermined value.

36. A focus detecting system according to one of claims 33, 34 or 35, wherein said predetermined value represents the width of the indiscernible focusing range of said focusing optical system.

37. A camera apparatus having an automatic focusing means, comprising:
   a) focus adjusting means for adjusting a focus condition of said apparatus;

b) detection means for detecting a focus degree and outputting a focus signal corresponding to said focus degree;

c) calculating means for calculating a plurality of focus signals corresponding to the focus degree output by said detection means at a plurality of points of time on the basis of a predetermined characteristic defining a relation of the position of said focus adjusting means and the focus degree in a movable range of said focus adjusting means for focusing operation relative to an in-focus position so as to predict an adjusting value of said focus adjusting means to which said apparatus becomes in-focus condition; and d) control means for controlling said adjusting means on the basis of said adjusting value predicted by said calculating means.

38. A camera apparatus according to claim 37, wherein said camera includes a focusing lens and an image pick-up means for picking up an image of an object formed on an image sensing plane by said focusing lens, and said adjusting means is arranged to adjust a relative distance between said focusing lens and said image pick-up means.

39. A camera apparatus according to claim 38, wherein said calculating means is arranged to predict an adjusting value to reach the in-focus condition on the basis of a predetermined characteristic curve, from the focus signals corresponding to the focus degree detected at different times, respectively.

40. A camera apparatus according to claim 38, wherein said control means drives said adjusting means for an extent which is smaller than said predicted adjusting value.

41. A camera apparatus according to claim 38, further comprising correcting means for correcting the value when said predicted adjusting value is larger than a predetermined value.

42. A focus detecting apparatus, comprising:
a) a focusing lens for forming an image on an image forming plane;
b) sensing means for sensing a focus condition of the image formed on the image forming plane and outputting a focus signal relative to the focus condition;
c) operating means for operating focus signals output from said sensing means at a plurality of successive positions of said focusing lens on the basis of a predetermined characteristic defining a relation of between a position of said focusing lens and a focus signal level so as to predict a position of said focusing lens where said focus condition is the in-focus condition.

43. A focus detecting apparatus according to claim 42, wherein said sensing means is an image sensing device for sensing the image formed on said image forming plane and outputting an image signal.

44. A focus detecting apparatus according to claim 43, further comprising a camera processing means for processing the image signal output from said image sensing device and outputting a video signal.

45. A focus detecting apparatus according to claim 42, wherein said operating means includes a micro computer which has said predetermined characteristic stored therein.

46. A focus detecting apparatus according to claim 45, wherein said predetermined characteristic is a Gaussian distribution curve.

47. A focus detecting apparatus according to claim 42, wherein said operating means predicts a deviation from the present position of said focusing lens to an in-focus position on the basis of the predetermined characteristic.

48. A focus detecting apparatus according to claim 47, further comprising a compensating means for compensating the deviation predicted by said operating means.

49. A focus detecting apparatus, comprising:
a) a focusing lens for forming an image on an image sensing plane of image pick-up means;
b) a focus sensor device for detecting a predetermined signal varying according to a focus condition;
c) processing means for processing the predetermined signal outputted from said focus sensor device to output a focus signal indicating a focus degree;
d) computing means for computing a deviation from the present position of said focusing lens to an in-focus position by using the focus signals output from said processing means at a plurality of successive positions of said focusing lens respectively, said computing means computing on the basis of predetermined characteristics of relations between positions of said focusing lens and levels of the focus signal which relate to a variation of position of said focusing lens, said predetermined characteristics being determined by in-focus positions; and
e) driving means for driving said focusing lens to the in-focus position predicted by said computing means.

50. A focus detecting apparatus according to claim 49, wherein said operating means includes a micro computer which said predetermined characteristic stored therein.

51. A focus detecting apparatus according to claim 50, wherein said predetermined characteristic is a Gaussian distribution curve.

52. A focus detecting apparatus according to claim 49, further comprising a compensating means for compensating the deviation predicted by said operating means.

53. A focus detecting apparatus according to claim 52, wherein said compensating means compensates a driving amount of said focusing lens by said driving means.

54. A focus detecting apparatus according to claim 49, wherein said image pick-up means combines with said focus sensor device and the focus signal is a high frequency component in an image signal output from said image pick-up means.

55. A camera having an automatic focus detecting device, comprising:
a) a focusing lens for forming an image on an image forming plan;
b) sensing means for sensing a focus condition of the image formed on said image forming plane and outputting a focus signal relative to the focus condition;
c) operating means for operating a plurality of focus signals outputted from said sensing means at a plurality of positions of said focusing lens, said focus signals including the focus signal at the last position of said focus lens and the focus signal at the present position of said focusing lens, on the basis of a predetermined function defining a relation between positions of said focusing lens and focus signal levels to predict a position of said focusing lens where said image formed on said image sensing plane is an in-focus condition; and d) driving means for driving said focusing lens according to an output of said operating means.

56. A camera according to claim 55, wherein said sensing means is an image sensing device for sensing the image formed on said image forming plane and outputting an image signal.

57. A focus detecting apparatus according to claim 55, further comprising a camera processing means for processing the image signal outputted from said image sensing device and outputting a video signal.

58. A focus detecting apparatus according to claim 55, wherein said operating means has a memory means for storing said predetermined function therein.

59. A focus detecting apparatus according to claim 58, wherein said predetermined function is a Gaussian distribution function.

60. A focus detecting apparatus according to claim 55, wherein said operating means predicts a deviation from the present position of said focusing lens to an in-focus position on the basis of the predetermined characteristic.

61. A focus detecting apparatus according to claim 60, further comprising a compensating means for compensating the deviation predicted by said operating means.

62. A camera having an automatic focus detecting device, comprising:

a) a focusing lens for forming an image on an image forming plane;

b) sensing means for sensing a focus condition of the image formed on said image forming plane and outputting a focus signal relative to the focus condition;

c) sampling means for sampling a level of the focus signal at predetermined periods of time in the state where said focusing lens is being driven;

d) memory means for storing the levels of the focus signal sampled by said sampling means;

e) predicting means for predicting a driving amount of said focusing lens from the present position to an in-focus position by computing the levels of the focus signal stored in said memory means on the basis of a predetermined function defining a relation between a position of said focusing lens and a level of the focus signal; and f) driving means for driving said focusing lens according to the driving amount obtained by said predicting means.

63. A camera according to claim 62, wherein said predetermined function is a Gaussian distribution function.

* * * * *

UNITED STATES PATENT AND TRADEMARK OFFICE
CERTIFICATE OF CORRECTION

PATENT NO. : 5,446,494
DATED : August 29, 1995
INVENTOR(S) : Kouichi Ueda et al.

It is certified that error appears in the above-indentified patent and that said Letters Patent is hereby corrected as shown below:

Col. 3, line 44.  Change "p" to -- P --.

Col. 4, line 15.  Insert -- $X_0=$ --.

Col. 4, line 17.  Change "ln" to -- $\ell n$ -- (both occurrences).

Col. 4, line 18.  Change "ln" to -- $\ell n$ --.

Col. 4, line 19.  Change "ln" to -- $\ell n$ -- (both occurrences).

Col. 4, line 20.  Change "ln" to -- $\ell n$ --.

Col. 4, line 35.  Change "nun" to -- mm --.

Col. 9, line 17.  Change "wherein ," to -- wherein, --.

Col. 9, line 25.  Delete "." (second occurrence).

Signed and Sealed this

Twenty-eighth Day of November 1995

Attest:

BRUCE LEHMAN

*Attesting Officer*     *Commissioner of Patents and Trademarks*